Jan. 2, 1968  E. H. WILLETTS  3,361,442
TANDEM WHEEL SUSPENSION
Filed April 8, 1965  4 Sheets-Sheet 1
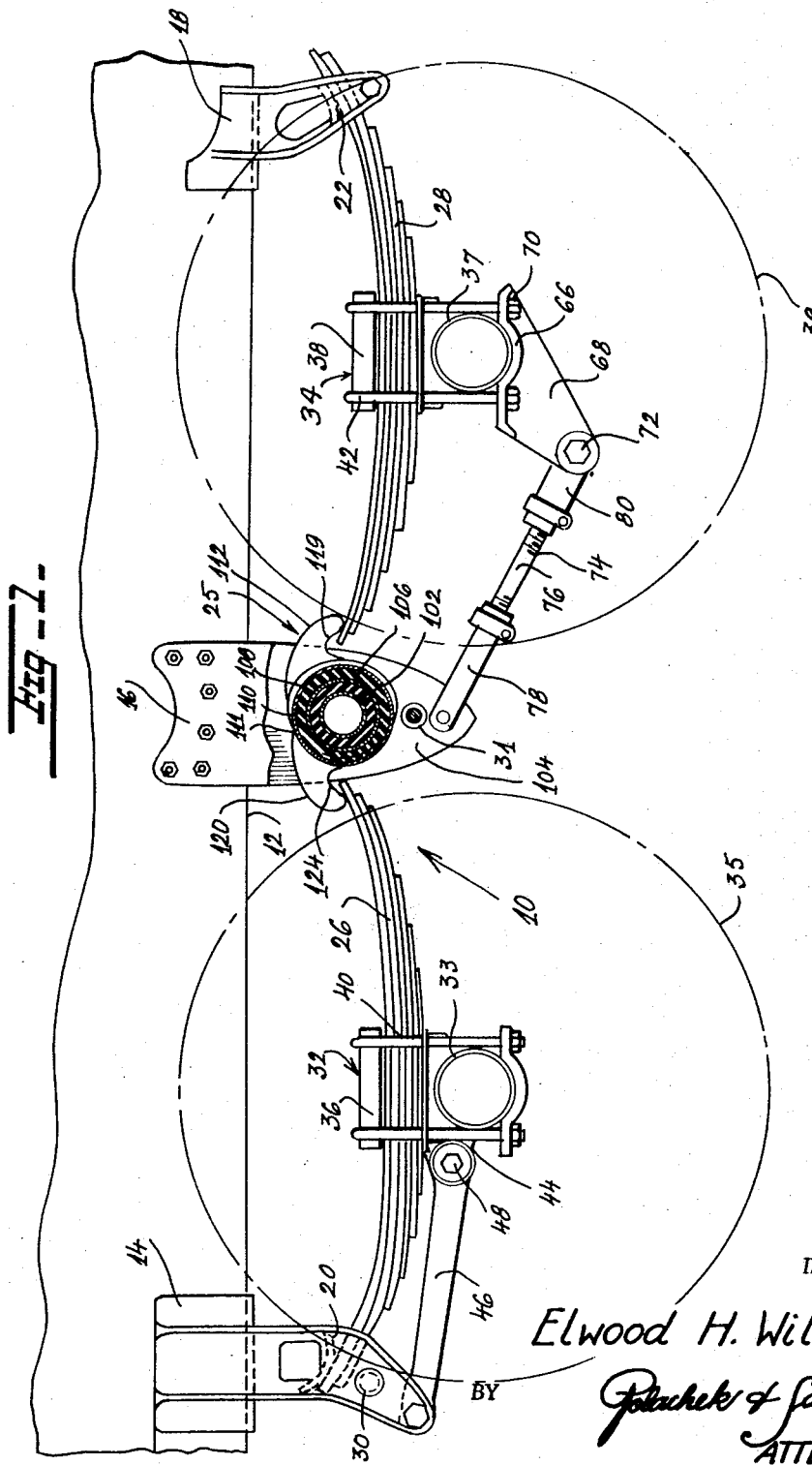
INVENTOR
Elwood H. Willetts
BY
ATTORNEYS.

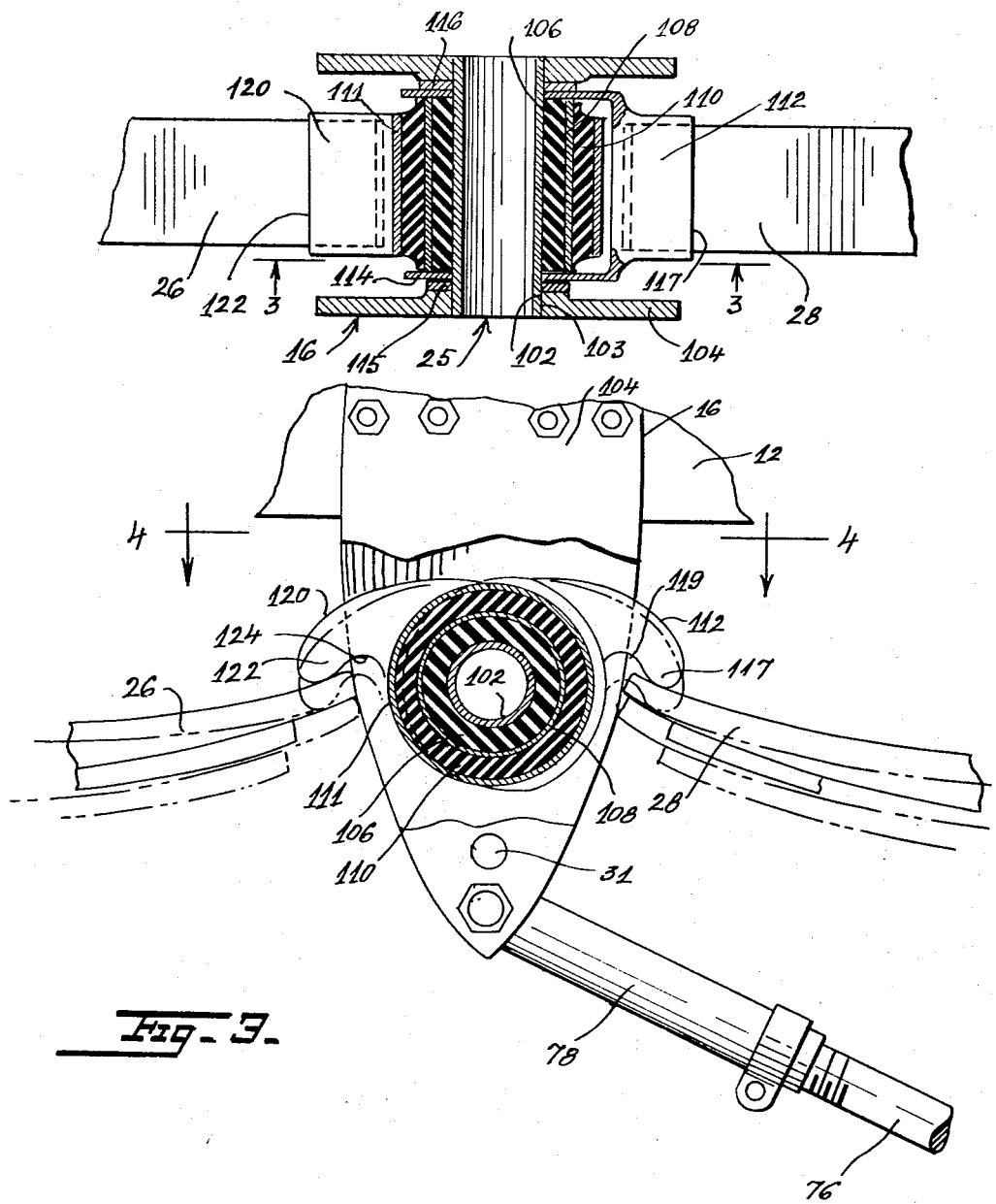

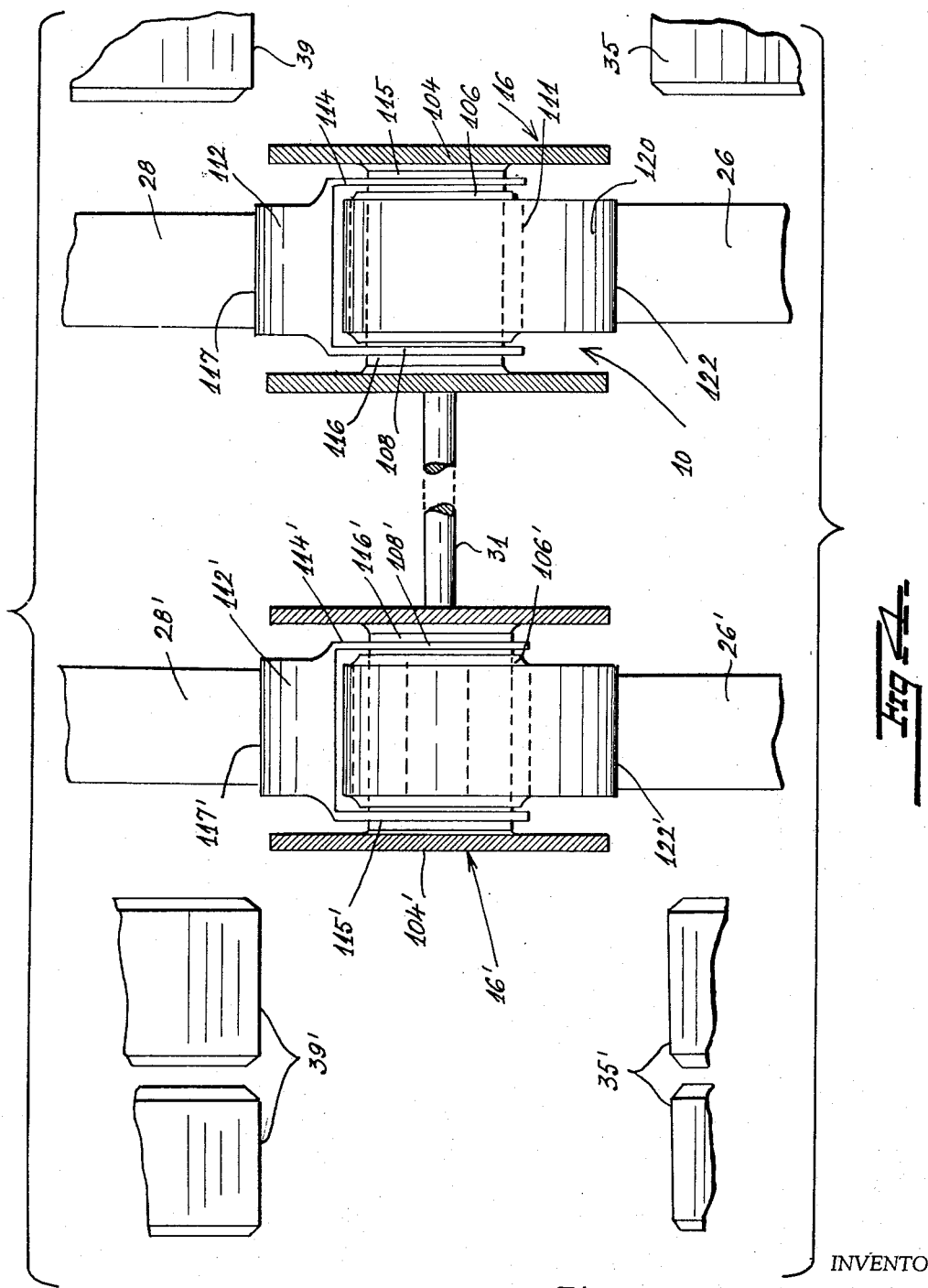

Jan. 2, 1968  E. H. WILLETTS  3,361,442
TANDEM WHEEL SUSPENSION
Filed April 8, 1965  4 Sheets-Sheet 4

INVENTOR
Elwood H. Willetts
BY Polachek & Saulsbury
ATTORNEYS.

United States Patent Office 3,361,442
Patented Jan. 2, 1968

3,361,442
TANDEM WHEEL SUSPENSION
Elwood H. Willetts, 320 Kenmore Road,
Douglaston, N.Y. 11363
Filed Apr. 8, 1965, Ser. No. 446,632
7 Claims. (Cl. 280—104.5)

ABSTRACT OF THE DISCLOSURE

This disclosure describes tandem axle suspensions for trailers in which a frame is supported by forward and rearwardly disposed leaf springs carried by axles. Brackets are provided at opposite sides of the frame carrying a shaft. A tubular elastomer is bonded to the shaft. Cushionable load equalizing means interconnect with each bracket and bear on adjacent inner ends of the springs. Vibration of any end of either axle is isolated from the bracket on the same side of the frame and from the end of the other axle on the same side of the frame, by deflection of the equalizing means on the one side of the frame.

Figure 5:
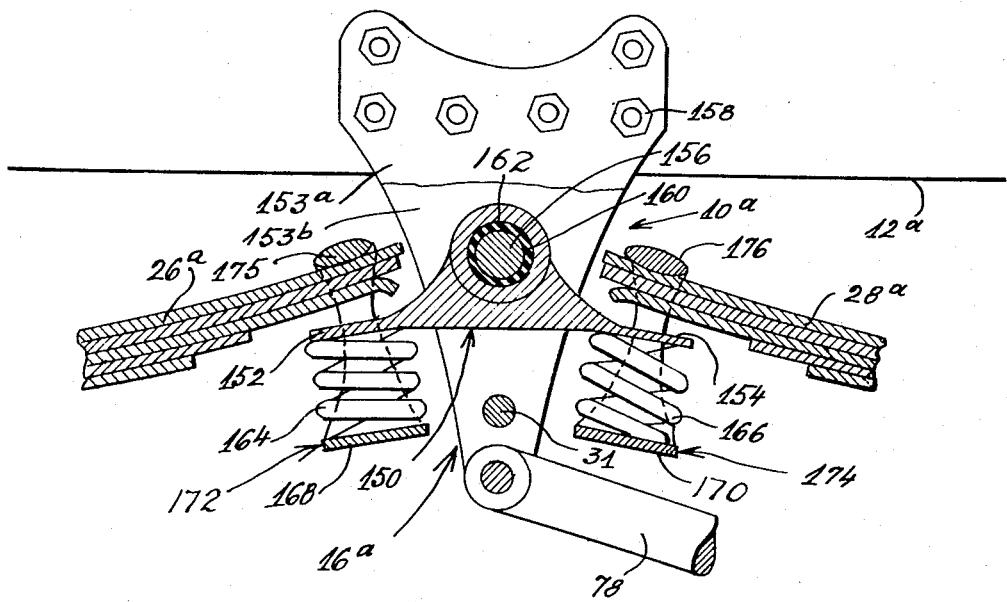

This invention relates to tandem axle suspension assemblies for trailers and the like, and has particular reference to tandem axle suspension bogies for vehicles having transversely disposed semi-elliptical springs secured to each axle, whereby the adjacent ends of each two such springs support the opposite ends of a rocker beam pivoted to the frame structure in a center bracket disposed longitudinally between the axles.

The rocker beam interconnecting adjacent spring ends on conventional tandem suspensions is relatively stiff and undamped as currently used. The beam serves as a pivoted bridge for transmission of road shocks and axle vibrations from one axle to the other axle. Such excitation of each axle by the other axle is contrary to the basic purpose of a suspension which should isolate the sprung mass from road shocks and from axle vibrations induced by the pneumatic tires supporting each axle. Thus the object of such suspensions is defeated by a design which so transmits exitation between its axles that wheel hop, pitch, and resonance are developed in normal operation on a perfectly smooth highway surface.

It has been found that radially true round tires in tandem axle and spring trailers, rolling over a perfectly smooth road or rotated on smooth surfaced rollers will induce vertical vibrations in their supporting axle. The conventional direct metallic bridge between inner ends of adjacent springs transfers such vibrations to the opposingly loaded axle which is caused to vibrate similarly. This compounds and increases a vibratory condition which a properly designed axle suspension should inhibit, minimize or eliminate.

As a result of this increase of vibration excitation, wheel hop, unequal brake torque reactions, hard riding qualities, and mechanical resonating conditions occur. All these undesired effects are the resultant products of the vibrations and impacts which are transmitted by an undamped metallic bridge between inner ends of the tandem springs. The vibrations and impacts mentioned stress the trailer frame and structure and react oppositely about the pitch axis of the trailer and on the fifth-wheel of the tractor hauling the trailer. All this results in physical discomfort to the driver, damage to fragile cargo, excessive wear and rapid deterioration of trailer frame and body, and excessive maintenance costs and repair of trailer and tractor.

Where multiple high leaf springs are used, the undesirable results produced by the vibratory and impact conditions described are made worse. The situation is not materially improved by use of single leaf springs having low inherent friction and high vibration rates.

The present invention overcomes substantially and effectively the above and other undesirable difficulties and disadvantages by providing means for isolating the axle vibrations and road shocks of each axle of a tandem suspension from its respective counterpart and from the vehicle structure, at the adjacent ends of the pair of springs on each side of the vehicle.

While a radially deflective rubber-like bushing in the rocker beam may be substituted for deflective means at the adjacent spring ends, lack of space in current conventional suspensions preclude such use as a replacement item. Present hinge pins are rubber bushed but are not radially deflective, as the ratio of bushing length to wall thickness of rubber is such as to sacrifice the rubber flow necessary for radial deformation in order to provide the desired radial load capacity.

In one form of the invention an isolator damper or shock absorber may comprise any deflectable means interposed between the adjacent spring ends and a conventional relatively stiff rocker beam. Such deflectable means may comprise helical steel springs, air, hydraulic or rubber-like resilient connections. In another form of the invention the isolator may comprise an articulated rocker beam employing a tubular elastomer stressed in torsional shear concentric with a pivotal connection to a central frame bracket, thereby providing resilient means between the bracket and the ends of adjacent springs.

In either form of the invention, the deflection of this isolator, damper or shock absorber will provide a reduction in the spring rate of each axle, while also isolating the excitations of each axle from the other axle.

In the first mentioned form of the invention load deflectable helical metal springs may be compressed at the ends of a rocker beam by the load transferred from adjacent ends of the axle mounted semi-elliptical springs through a stirrup from above the axle-mounted spring to an integral seat on the rocker beam under the helical spring, thereby providing resilient means between the bracket and the ends of adjacent springs. The rocker beam may be above the adjacent spring ends, with compression springs therebetween, or rubber-like compression springs may be substituted for the metallic springs. Air, hydraulic, or non-liquid dampers may also be substituted.

In the other form of the invention, the isolator, damper or shock absorber utilizes a pivoted beam having an articulation joint in the middle of its length whereat it is pivoted on a first tubular elastomeric bushing in the central frame bracket, with one arm of the articulated beam secured outwardly of said bushing on a first sleeve over which a second tubular elastomeric bushing is bonded, and in turn the second elastomeric bushing is secured to a second sleeve carrying an opposing arm of the articulated beam. Thus both opposing arms of the articulated beam are torque reactive about the second tubular elastomeric bushing which is stressed in torsional shear to resist torsional deflection of the opposing members of the articulated rocker beam.

In this form of the invention the opposing arms forming parts of the articulated beam assembly are installed between inner ends of longitudinally disposed springs mounted on tandem axles of a trailer. The invention replaces the stiff metal rocker beam commonly used heretofore to interconnect spring ends at the frame bracket of a tandem axle suspension.

It is therefore a principal object of the invention to provide an effective structure for isolating road impacts and axle vibrations of a tandem axle suspension from the sprung mass of a vehicle body and frame, and from the respective opposing axles of a tandem bogie.

A further object is to provide an isolator, damper or shock absorber between a frame bracket and the adjacent ends of longitudinally disposed springs of tandem axles in a vehicle suspension.

A further object is to provide a resilient connection between adjacent ends of springs supported by tandem axles on each side of a vehicle, to prevent transfer of tire-induced axle vibrations and road shocks from one axle to its adjacent parallel axle.

Another object is to provide an articulated beam suspension for tandem axles, which avoids use of direct metallic bridges pivoted beams, bell crank levers and chains interconnecting both springs between their supporting axles.

A further object is to provide a torque reactive articulated beam suspension to reduce axle and spring vibration and avoiding prior use of rigid metalling rocker beams or bridges pivoted midlength and interconnecting springs between forward and rearward tandem axles.

Still another object is to provide a torque reactive articulated beam suspension of tandem axles including a concentric, coaxial assembly of tubular elastomeric bushings and shafts with attached radially extending arms.

A further object is to provide an isolator including a pair of spring means at opposite ends of a rocker beam engaging ends of semi-elliptical springs in a tandem axle suspension assembly, with an elastomeric bushing interposed between a shaft and the rocker beam.

A still further object is to provide an isolator including a low torque elastomeric cylindrical first bushing secured to a frame bracket attached to a trailer frame or body, a first cylindrical sleeve bonded circumferentially to the exterior of the first bushing, a second elastomeric bushing bonded circumferentially to the exterior of the first sleeve, a radially extending first torque beam arm secured to the first sleeve, a second sleeve bonded circumferentially to the exterior of the second bushing, a second radially extending torque arm secured to the second sleeve, the two arms extending in opposite directions, to constitute a concentrical coaxial assembly of shaft, bushings and sleeves with attached arms, defining a torque reactive articulated beam structure.

For further comprehension of the invention, and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a side view partially in section of an isolator assembly including a torque reactive articulated beam suspension for a vehicle having tandem axles and springs, FIG. 2 is an enlarged horizontal sectional view through the articulated beam suspension, FIG. 3 is a view similar to a portion of FIG. 1, but on an enlarged scale, taken on line 3—3 of FIG. 2, FIG. 4 is a horizontal plan view taken on line 4—4 of FIG. 3, and FIG. 5 is a side view partially in section of another isolator assembly.

Referring to FIGURES 1 to 4, there are shown two identical tandem assemblies 10 and 10' operatively connected to the underside of a trailer 12 at opposite sides thereof. Since both tandem assemblies are identical only assembly 10 will be described in detail and this description will suffice for assembly 10'. Corresponding parts of assembly 10' will be indicated by primed numbers identical respectively to the numbers assigned to assembly 10.

Tandem assembly 10 includes a forward spring hanger bracket 14, an intermediate bracket 16, and a rearward spring hanger bracket 18. The forward bracket 14 includes a spring bearing surface 20, and the rearward spring hanger bracket 18 has a symmetrically opposed spring bearing surface 22.

A front leaf spring assembly 26 is carried at its forward end by the forward spring hanger bracket 14. Its rear end is engaged at articulated beam suspension 25. A rear leaf spring assembly 28 is carried by the rearward spring hanger bracket 18 and its forward end is engaged at beam suspension 25. Suitable tie pipes 30, 31 are carried by the brackets 14 and 16 and join the tandem assembly 10 with its identical opposed assembly 10 at the opposite side of trailer 12.

Carried centrally of the forward leaf spring assembly 26 is an axle spring seat 32 for forward axle 33 on which is forward wheel 35. Carried in like manner by the rearward leaf spring assembly 28 is an axle spring seat 34 for axle 37 on which is rearward wheel 39. The axle spring seat 32 and 34 are of a generally similar construction, carrying bearing blocks 36, 38, respectively, above the spring assemblies. Spaced apart U-bolts 40, 42 join the respective axle housings to the springs. These spring seats 32 and 34 are joined to the trailer axles 33, 37 and to the spring assemblies 26, 28 respectively.

The forward spring seat 32 carries a forwardly extending bracket means 44 for operatively receiving a torque bar 46. The torque bar 46 is pivotally connected at its rearward end to the bracket 44 by a bolt 48, this connection being forward and above the axis of rotation of the forward axle 33. The torque bar 46 extends toward and upwardly at a relatively small angle to the horizontal and is connected to the forward spring hanger bracket 14.

The spring seat 34 carries a downwardly and forwardly extending flange 66, having web 68. The flange 66 is conveniently joined to the rearward axle spring seat 34 by any suitable means such as bolts 70 engaging the U-bolts 42. The lower ends of the web 68 are apertured to receive a bolt 72. Pivotally joined at its rearward end to this bolt 72 is a rear torque bar 74, this connection being a rather substantial distance below the axis of rotation of the rear axle 37. The rear torque bar 74 extends upwardly and forwardly at a relatively steep angle with respect to the horizontal and to the front torque bar 46. The rear torque bar 74 is joined at its forward end to the intermediate bracket 16.

The rear torque bar 74 is adjustable in length by the provision of an externally threaded central rod 76 engaging at its opposite ends cooperative internally threaded sleeves 78 and 80. The rod 76 is oppositely threaded at its ends so that rotation of the rod 76 in one direction increases the length thereof while rotation in the opposite direction decreases this length.

To the extent described, the structure is conventional and substantially similar to that described in Patent 3,123,377. Now in accordance with the invention, there is provided the articulated beam suspension 25 including a cylindrical shaft 102 which is welded to or otherwise secured in openings 103 of opposite walls 104 of bracket 16. Bonded circumferentially to the exterior of the shaft and spaced from ends thereof is a first elastomeric bushing 106. Bonded circumferentially to bushing 106 is a cylindrical first sleeve shaft 108. Bonded circumferentially to the exterior of shaft 108 is a second elastomeric bushing 110. A second cylindrical sleeve 111 is bonded circumferentially to the exterior of bushing 110.

A first arm 112 extends radially rearwardly from the concentric, coaxial assembly of bushings and shafts. Arm 112 has parallel arcuate vertical flanges 114 secured to opposite ends of sleeve 108. The ends of sleeve 108 extend outwardly beyond bushings 106 and 110 since this shaft is axially longer than the bushings but shorter than shaft 102. Ring washers 115, 116 are mounted on shaft 102 between the walls 104 of the bracket 16 and flanges 114 since relative movement occurs between these flanges and walls 104. The outer or rear end 117 of arm 112 is turned downwardly to provide a recess 119 in which the forward end of spring 28 seats.

A second arm 120 is secured to the sleeve 111 and extends forwardly oppositely from rearward extending arm 112. Arm 120 has a downwardly extending end 122 with a recess 124 in which seats the rear end of spring 26.

FIG. 3 shows in dotted lines that rotational movements of the arms and vertical deflections of the springs are possible while the bracket 16 remains stationary. It will be noted that both elastomeric bushings 106 and 110 are stressed in torsional shear. The torsional reaction of the first bushing 106 is between the supporting innermost shaft 102 in frame bracket 16 and the first sleeve 108 connected to arm 112. The reaction of the second elastomeric bushing 110 is between the arms 112 and 120 of the articulated beam. These arms are torque reactive, since the interconnecting elastomers are oppositely stressed at opposite edges by the opposing arms as a load is applied. One end of this torque reactive articulated beam may deflect twice as much as though the both ends were under a given load. The spring rate at each end of this articulated torque beam 25 is one half of what it would be were the beam not torque reactive. This singularly lower spring rate for a given load at each end of the interconnecting articulated suspension beam also limits transfer of axle vibrations and road shocks from each axle, beyond the tubular elastomeric bushings, which are stressed in torsional shear and resiliently connect the torque reactive sections of the articulated suspension beam.

FIG. 5 shows another isolator assembly 10a which has a stiff rocker beam 150 having oppositely directed horizontal arms 152, 154. The beam is supported by an axially horizontal shaft 156 secured at opposite ends to side walls 153a, 153b, of a hanger bracket 16a, which in turn is mounted by bolts 158 on trailer frame 12a. A cylindrical elastomeric bushing 160 is interposed between the shaft 156 and sleeve 162 which forms part of rocker beam 150. Secured by welding or otherwise to the undersides of arms 152, 154 are upper ends of helical springs 164, 166. The lower ends of the springs bear on and are secured to bottom plates 168, 170 of stirrups 172, 174. Cross bars 175, 176 of the stirrups bear on adjacent ends of springs 26a, 28a. Other parts of the assembly corresponding to those of assemblies 10 and 10′ and corresponding parts are identically numbered.

The rocker beam 150 pivots angularly on fixed shaft 156 with the bushing 160 stressed in torsional shear. In addition the springs 164, 166 cooperate with the bushing 160 in damping vibration of the ends of the springs 26a, 28a. Instead of helical metal springs 164, 166, elastomeric blocks, air, hydraulic, or non-liquid shock absorbers, dampers or isolators may be substituted.

Both forms of the invention described are low in cost and light in weight. Both forms are economical for replacement of conventional stiff rocker beams in currently used axle suspensions, to appreciably improve isolation of the sprung mass from axle vibration and road shocks.

While the isolators can be directly installed as replacements for the rocker beams in a tandem axle trailer suspension, they are not restricted thereto and can be used in other tandem axle installations.

What is claimed is:

1. An articulated beam suspension for a tandem assembly having opposed longitudinally spaced apart front and rear leaf spring assemblies, forward and rearward spring hanger means for receiving ends of the respectively leaf spring assemblies, opposed front and rear axle housing means joined to central points of the respective spring assemblies and receiving transverse axles, and an intermediate hanger bracket attachable to a frame of a vehicle and disposed between adjacent spaced rear and front ends respectively of the front and rear spring assemblies, said suspension comprising a first cylindrical sleeve, a cylindrical second sleeve coaxially and concentrically disposed around said first sleeve, opposing arms respectively extending substantially radially from said sleeves, one of said arms extending forwardly and the other arm extending rearwardly for engagement of the rear and front ends respectively of the front and rear spring assemblies, first means resilient torsionally, radially, axially and angularly relative to the common axis of said concentric and interconnecting the same sleeves, a shaft securable to the intermediate hanger bracket, said shaft being coaxially and concentrically disposed within said first sleeve, and second means resilient torsionally, radially, axially and angularly interconnecting the concentric first sleeve and shaft.

2. An articulated beam suspension for a tandem assembly having opposed longitudinally spaced apart front and rear leaf spring assemblies, forward and rearward spring hanger means for receiving ends of the respectively leaf spring assemblies, opposed front and rear axle housing means joined to central points of the respective spring assemblies and receiving transverse axles, and an intermediate hanger bracket attachable to a frame of a vehicle and disposed between adjacent spaced rear and front ends respectively of the front and rear spring assemblies, said suspension comprising a first cylindrical sleeve, a cylindrical second sleeve coaxially and concentrically disposed around said first sleeve, opposing arms respectively extending substantially radially from said sleeves, one of said arms extending forwardly and the other arm extending rearwardly for engagement of the rear and front ends respectively of the front and rear spring assemblies, first means resilient torsionally, radially, axially and angularly relative to the common axis of the sleeves and interconnecting the concentric sleeves, a shaft securable to the intermediate hanger bracket, said shaft being coaxially and concentrically disposed within said first sleeve, and second means resilient torsionally, radially, axially and angularly interconnecting the concentric first sleeve and shaft, said first and second resilient means consisting of rubber-like tubular bushings respectively bonded between the first and second sleeves, and between the first sleeve and shaft.

3. An articulated beam suspension for a tandem assembly having opposed longitudinally spaced apart front and rear leaf spring assemblies, forward and rearward spring hanger means for receiving ends of the respectively leaf spring assemblies, opposed front and rear axle bracket means joined to central points of the respectively spring assemblies and receving transverse axles, and an intermediate hanger bracket attachable to a frame of a vehicle and disposed between adjacent spaced rear and front ends respectively of the front and rear spring assemblies, said suspension comprising a first cylindrical sleeve, a cylindrical second sleeve coaxially and concentrically disposed around said first sleeve, opposing arms respectively extending substantially radially from said sleeves, one of said arms extending forwardly and the other arm extending rearwardly for engagement of the rear and front ends respectively of the front and rear spring assemblies, first means resilient torsionally, radially, axially and angularly relative to the common axis of the sleeves, interconnecting the concentric sleeves, a shaft securable to the intermediate hanger bracket, said shaft being coaxially and concentrically disposed within said first sleeve, and second means resilient torsionally, radially, axially and angularly interconnecting the concentric first sleeve and shaft, said first and second resilient means consisting of rubber-like tubular bushings respectively bonded between the first and second sleeves, and between the first sleeve and shaft, said one arm being secured to said second sleeve, said second arm having a pair of vertical, parallel, spaced flanges extending forwardly and secured to opposite ends of said first sleeve, said shaft being axially longer than the first and second sleeves for securing opposite ends of the shaft to opposed wall portions of the intermediate hanger bracket.

4. In combination, a vehicle frame, two pairs of wheel supported spring assemblies disposed longitudinally of the frame at opposite sides thereof, a pair of torque reactive beam assemblies operatively connecting the respective pairs of spring assemblies to the frame at opposite sides thereof, each of said beam assemblies including a pair of longitudinally aligned torque reactive opposing support arms, a pivotally disposed first sleeve secured to one arm, a pivotally disposed second sleeve secured to the other arm, said sleeves being nested one within the other, first resilient means interconnecting the sleeves, a stationary shaft attached nonrotatably to said frame and nested within the first sleeve, and second resilient means interconnecting the first sleeve and shaft, said first and second resilient means being tubular bushings, one bushing being bonded at both diameters to the sleeves, the other bushing interconnecting said first sleeve and shaft, each of said bushings being torsionally, radially, axially and angularly resilient relative to a common axis of the sleeves and shaft, whereby road shocks and vibration of said wheels are substantially isolated from the vehicle frame by the torque reactive beams.

5. In combination, a vehicle frame, two pairs of spring assemblies respectively located at opposite sides of said frame, two torque reactive articulated beam structures respectively connecting each pair of spring assemblies to said frame, each of said beam structures including first and second concentrically disposed sleeves, longitudinally aligned support arms extending respectively from the sleeves in opposite directions, a first resilient bushing interconnecting the sleeves, a stationary shaft attached nonrotatably to said frame, a second resilient bushing interconnecting the first sleeve and shaft, the second resilient bushing being disposed concentrically within the first sleeve shaft and having less angular deflection than the first bushing interconnecting the sleeves, one of said arms being secured circumferentially to said second sleeve, the other of said arms having spaced parallel flanges secured to opposite ends of said first sleeve, said shaft extending axially at its ends beyond the bushings and sleeves, and a hanger bracket attached to said vehicle frame, said ends of the shaft being attached to said hanger bracket.

6. A torque reactive suspension for a vehicle frame with respect to a tandem axle assembly, comprising concentrically disposed sleeves, longitudinally aligned support arms extending respectively from the sleeves in opposite directions, a first resilient bushing interconnecting the sleeves, a stationary shaft attached nonrotatably to said frame, a second resilient bushing interconnecting the first sleeve and shaft, the second resilient bushing and shaft being disposed concentrically within the first sleeve and having less angular deflection than the first bushing interconnecting the sleeves, whereby road shocks and vibrations of said axle assembly are substantially isolated from said vehicle frame, one of said arms being secured circumferentially to said second sleeve, the other of said arms having spaced parallel flanges secured to opposite ends of said first sleeve, said shaft extending axially at its ends beyond the bushings and sleeves, a hanger bracket attached to said vehicle frame, said ends of the shaft being attached to said hanger bracket, whereby the sleeves, and the inner sleeve and shaft are resiliently interconnected.

7. An articulated beam suspension for a tandem assembly, comprising a frame structure, horizontal axles disposed transversely of and below the frame and spaced apart longitudinally of the frame, a first pair of leaf springs supported on one axle at opposite sides of the frame, a second pair of leaf springs supported on the other axle, forward ends of the first pair of leaf springs and rear ends of the second pair of leaf springs being operatively engaged with and supporting the frame structure, supporting brackets fixed on opposite sides of the frame structure, midway of the axles, a transverse extending horizontal shaft supported at opposite ends by respective brackets, a tubular elastomeric bushing bonded to said shaft, and cushionable load equalizing means connected with each bushing and engaged with adjacent ends of the first and second pair of leaf springs on opposite sides of the frame, said load equalizing means being operable at all loads imposed on the frame whereby vibration of each end of each axle at each side of the frame is isolated from the bracket at the same side of the frame and from the end of the other axle at the same side of the frame by deflection in said equalizing means at the same side of the frame, at all loads imposed upon said frame, said cushionable load equalizing means comprising a first sleeve surrounding said tubular elastomeric bushing, a second elastomeric bushing surrounding and bonded to the first sleeve, a second sleeve surrounding and bonded to the second elastomeric bushing, a pair of radially extending arms at opposite ends of the first sleeve, a radially extending arm on the second sleeve, said latter arm being directed oppositely from the first named arms, the pair of arms having free ends extending over and engaged with adjacent ends of the first leaf spring, the arm having a free end extending over and engaged with adjacent ends of the second leaf springs.

References Cited

UNITED STATES PATENTS

| | | | |
|---|---|---|---|
| 1,893,695 | 1/1933 | Chenoweth | 280—104.5 |
| 2,401,568 | 6/1946 | Junkin | 280—104.5 |
| 3,157,412 | 11/1964 | Frazier | 280—104.5 |
| 3,171,668 | 3/1965 | Willetts | 267—57.1 X |
| 3,195,916 | 7/1965 | Cain | 280—104.5 |

BENJAMIN HERSH, *Primary Examiner.*

PHILIP GOODMAN, *Examiner.*